(12) United States Patent
Morales

(10) Patent No.: US 6,215,404 B1
(45) Date of Patent: Apr. 10, 2001

(54) NETWORK AUDIO-LINK FIRE ALARM MONITORING SYSTEM AND METHOD

(76) Inventor: Fernando Morales, 2231 Wakerobin La., Reston, VA (US) 22091

( * ) Notice: Subject to any disclaimer, the term of this patent is extended or adjusted under 35 U.S.C. 154(b) by 0 days.

(21) Appl. No.: 09/275,546

(22) Filed: Mar. 24, 1999

(51) Int. Cl.$^7$ ................................................ G08B 19/02
(52) U.S. Cl. ..................... 340/577; 340/531; 340/541; 340/584
(58) Field of Search ........................ 340/577, 584, 340/531, 541, 571

(56) References Cited

U.S. PATENT DOCUMENTS

| | | | |
|---|---|---|---|
| 4,951,029 | * 8/1990 | Severson | 340/506 |
| 4,956,866 | * 9/1990 | Bernstein et al. | 381/43 |
| 5,400,011 | * 3/1995 | Sutton | 340/566 |
| 5,414,409 | * 5/1995 | Voosen et al. | 340/514 |
| 5,450,061 | * 9/1995 | McMaster | 340/550 |
| 5,546,072 | * 8/1996 | Creuseremee et al. | 340/574 |
| 5,568,121 | * 10/1996 | Lamensdorf | 340/539 |
| 5,736,927 | * 4/1998 | Stebbins et al. | 340/506 |
| 5,861,804 | * 1/1999 | Fansa et al. | 340/539 |
| 5,889,468 | * 3/1999 | Banga | 340/628 |
| 5,914,656 | * 6/1999 | Ojala et al. | 340/521 |
| 6,035,016 | * 3/2000 | Moore | 379/45 |
| 6,049,272 | * 4/2000 | Lee et al. | 340/539 |

OTHER PUBLICATIONS

Nelson, Ronald E. Text downloaded from Internet, Mar. 23, 1999 http://web.wt.net/~ess /almp3.htm.

Smith, William Home Alarms by Secure America Text downloaded from the Internet, Mar. 23, 1999 http://www.alphalist.com/dealer/homealarm.htm.

Freeman Marketing Inc. Security Product Superstore Home Alarms Online Catalog Downloaded from the Internet Mar. 23, 1999 http://www.freeman–mkt.com/homealar.htm.

BH&G Home Improvement Encyclopedia Electric & Phone Home Security Options. Text downloaded from the Internet, Mar. 23, 1999 http://www.bhglive.com/homeimp/docs/voooo714.htm.

MultiGard Security Systems Home Alarm Systems and Products Text downloaded from the Internet, Mar. 23, 1999 http://www.ring.com/multig~1/Home.htm.

* cited by examiner

Primary Examiner—Jeffery Hofsass
Assistant Examiner—Son Tang
(74) Attorney, Agent, or Firm—Roberts Abokhair & Mardula, LLC

(57) ABSTRACT

A network audio-link alarm monitoring system for sensing the sound from triggered alarms and reporting the arm to alarm authorities. The system and method of the invention relies on the aural sound produced from alarms that have been triggered. The system, implemented on a PC or other processor on premises, differentiates the sound coming from different alarms, characterizes the sound as from a particular alarm via FFT processing and reports the alarm over the Internet, public switched telephone, or other communication link to a central station which then reports the alarm to the alarm authority. In another embodiment, the reporting of the alarm is done directly by the PC at the residence or business to the alarm authority over the Internet or other communication link.

7 Claims, 2 Drawing Sheets

NETWORK AUDIO-LINK FIRE ALARM MONITORING SYSTEM AND METHOD

FIELD OF THE INVENTION

This invention relates generally to home security alarm systems. More particularly, the present invention is an audio recognition system for characterizing an alarm from the audio output of the alarm.

BACKGROUND OF THE INVENTION

The home alarm system market is a huge market, growing at 12–15% annually. This market consists of fire alarms, burglar alarms, glass breaking alarms, and personal emergency response systems, to name but a few. Further, with only 10–12% of the home market penetrated with such home alarm systems, the market potential is tremendous. This same potential for alarm systems exists in the commercial sector, with businesses and industries accounting for a large sector of the marketplace.

All of these installations rely upon similar types of technologies, both wired and wireless, for providing an alarm to a central station that a break-in or some other type of emergency occurs. This is typically accomplished by some local detector at a window, a door, or in the ceiling, detecting the presence of an activity to be reported. The detector sends a signal to a local processor, usually on premises. That local processor then sends a signal over telephone lines or via a cellular network to a central station which is monitoring the system. The central station will then call the police, fire department, or anyone else a user has selected to notify them that an alarm has occurred.

There are many ways to send signals from the premises to a central station. A regular telephone line can be used. A cellular network can be used. A long range radio has some potential in areas of some degree of remoteness, or a dedicated line can be leased from the telephone company. The most common approach is to simply use a regular telephone line to transfer these signals.

These alarm signals work very well for reporting the particular break-in, but require a central monitoring station to interpret the results. This in turn requires that a full system be installed in a home, and the system, either wired or wireless, to link to the central station over telephone lines for that purpose.

Simultaneous with this growth of home alarm systems has been the growth of Internet access for individuals using PC's and other types of equipment. Access to the Internet is typically via a local point of presence via an Internet service provider ("ISP"). Using the Internet, an individual can literally access sites on the other side of the world from the location of the PC. If a personal computer can somehow be used for the monitoring of a home security system, the Internet can serve as the basis for transmitting a particular alarm that has sounded to a monitoring facility that can be located anywhere. Thus, the need for a central station linked to a specific telephone could potentially be eliminated in favor of Internet access to that monitoring station.

SUMMARY OF THE INVENTION

In view of the above market and monitoring options, the present invention offers an Internet option for the monitoring of home security systems.

It is therefore an object of the present invention to monitor security in a home through a variety of detectors.

It is a further objective of the present invention to allow home security monitoring to occur in a wireless mode.

It is a further objective of the present invention to allow an audio monitoring of detectors in the home, rather than a wireless RF monitoring function.

It is a further objective of the present invention to provide Internet monitoring by a central station of a plurality of home security systems.

It is yet another objective of the present invention to allow a central station located anywhere on the Internet to provide monitoring services to a plurality of homes connected to the Internet but located anywhere in the world.

These and other objectives of the present invention will become apparent from a review of the specification that follows.

The present invention is an Internet audio-link security alarm monitoring system. As noted above, present systems involve a number of detectors that are connected, either in a wired or a wireless mode, to a local station. When an alarm sounds, the local station provides a signal to a central station, usually over normal telephone lines, that an alarm has been tripped. Usually, the central station can determine what zone or type of alarm has been tripped and provide an appropriate message to the police/fire/individual whom the user would like to have notified.

In contrast, the present invention is a personal computer that is connected to the Internet. The personal computer also has a microphone, which is used to listen for the audible alarm siren from a smoke detector, or other alarm device. Fast fourier processing of the input audio signal allows the personal computer to recognize the type of alarm being sounded. For example, a smoke detector would have one type of siren and a break-in alarm would have a different type of siren, as would a "water in the basement" detection device.

In practice, when an alarm is sounded, the sound is detected by the microphone at the PC. The PC identifies the frequency, characterizes the frequency, and identifies it as emanating from a particular source.

Upon the detection of an alarm siren, the PC dials or otherwise accesses the Internet connection and accesses a particular URL associated with a monitoring station. Given the pervasive nature of the Internet, the monitoring station can be located anywhere.

A signal, e-mail or other communication is then sent to the URL of the monitoring station that a particular alarm has gone off. The monitoring station then has a database of all users who are subscribers to the monitoring station. Stored with the user database is the local telephone numbers associated with the police, fire department, or any other individual that the user wishes to contact in the event of an emergency. The central monitoring station can then automatically place a telephone call, e-mail, fax, or otherwise communicate in either in an automated mode or in person, reporting the indication of an alarm at the user's premises.

In an alternative embodiment, the PC can characterize the siren that is sounding. If, for example, the siren is from a smoke alarm, the PC can automatically dial the telephone number of the fire department and notify the fire department via voice synthesis or in other manners known in the art, that a smoke alarm has gone off in the user's premises. In this fashion, the fire department can then dispatch appropriate vehicles to meet the demand of the alarm that has sounded.

Other capabilities of the present invention will be apparent from a review of the detailed description of the invention that follows.

DETAILED DESCRIPTION OF THE FIGURES

Figure 1:
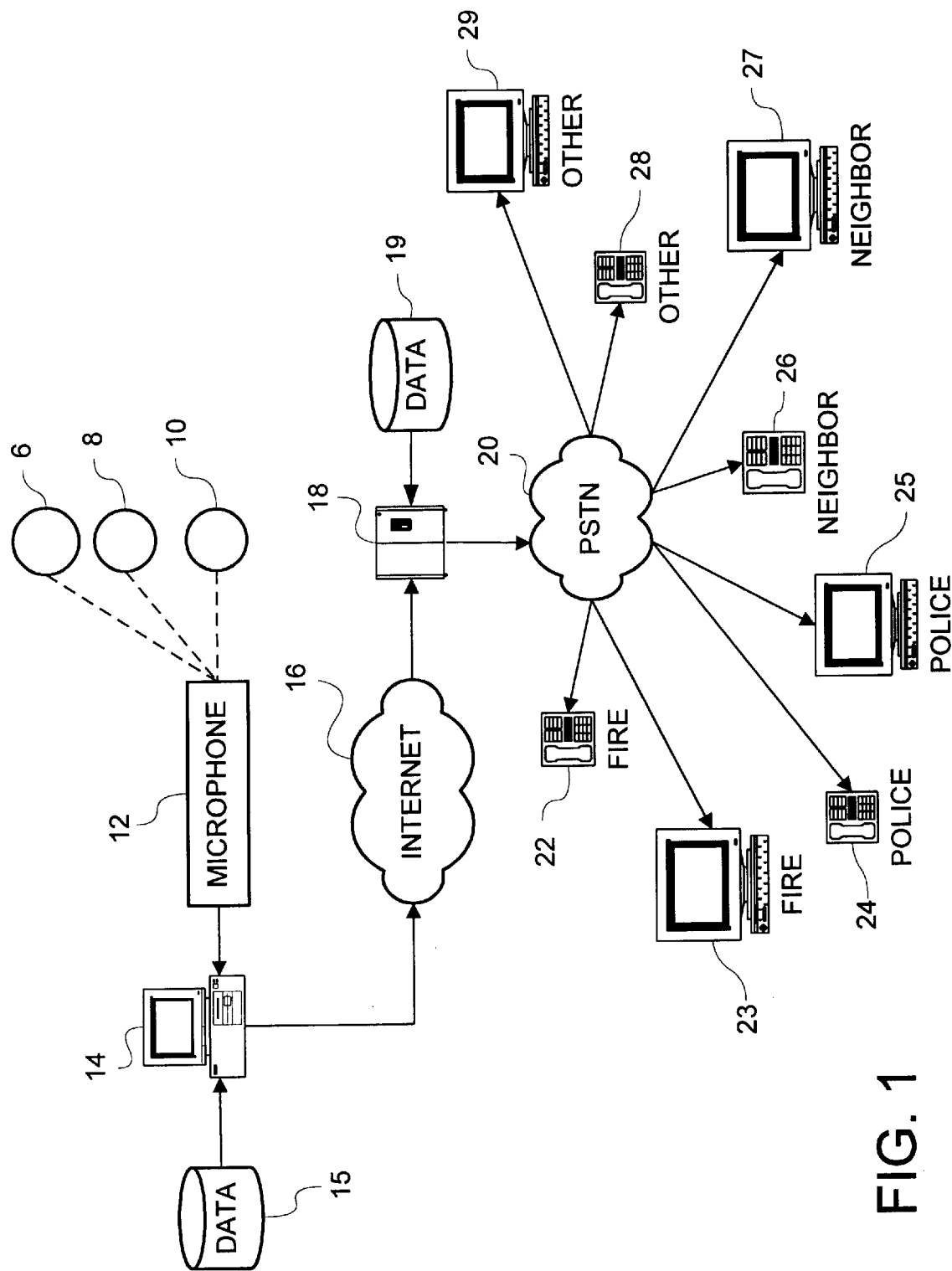
FIG. 1 is an illustration of the architecture of the present invention, with a monitoring station contacting designated authorities.

Referring to FIG. 1, the architecture of the present invention wherein a monitoring station contacts alert authorities is illustrated. Detector 10 is triggered. The detector can be a fire alarm, glass breaking alarm, water alarm, or any other alarm typical of a home security or business security system. The alarm 10 puts out an audible signal which is detected by microphone 12.

Microphone 12 is connected to a PC 14 which constantly monitors for the audio input from microphone12.

The monitoring performed by the PC 14 is the constant monitoring to perform a fast fourier transform on the audio signal received to obtain the predominant frequency of that input audio signal. A second fast fourier transform can find the period of the predominant frequency. These two characteristics allow the PC to characterize the input audio signal as an alarm coming from a particular alarm device 10. For example, alarm 6 may put out one frequency of a particular period. Alarm 10 will put out a different frequency as will alarm 8. Each of these is separately detected and characterized and compared against the stored database of the alarms of the system, stored within the hard drive typically found in PC 14.

In order to initialize the system of the present invention, PC 14 must be trained on the individual alarms 6, 8, and 10, with respect to the audio signal that is emitted from these alarms. This is a typical training routine known in the art. In addition, in situ training is conducted by the PC so that alarm 6, which may be located in the bedroom can sound, and the PC can train on the fact that it is distant from the microphone 12. Similarly, alarm 8 may be located in the kitchen, which would be a different distance from microphone 12. In these cases, the characteristics of the audio signal together with its intensity all serve to be elements of the calculations that allow PC 14 to characterize the sound as coming from a particular alarm. The association of sound with the type of alrm is stored in database 15 so that the identity of the arm can be communciated to the central station in the event that the alarm is triggered.

Once the signal is detected and characterized, the PC triggers a communication program which connects the PC to the Internet 16. This is typically done through a normal ISP connection to the Internet. Thereafter, the URL to the monitoring station 18 is invoked, and a pre-formatted message from PC 14, which may be a fax, e-mail or other type of message is sent over the Internet 16 to the monitoring station 18 noting which alarm has sounded and the characteristics associated with that alarm. For example, it will be important to note for the monitoring station that a "break glass" alarm has sounded or that a fire alarm has sounded.

Figure 2:
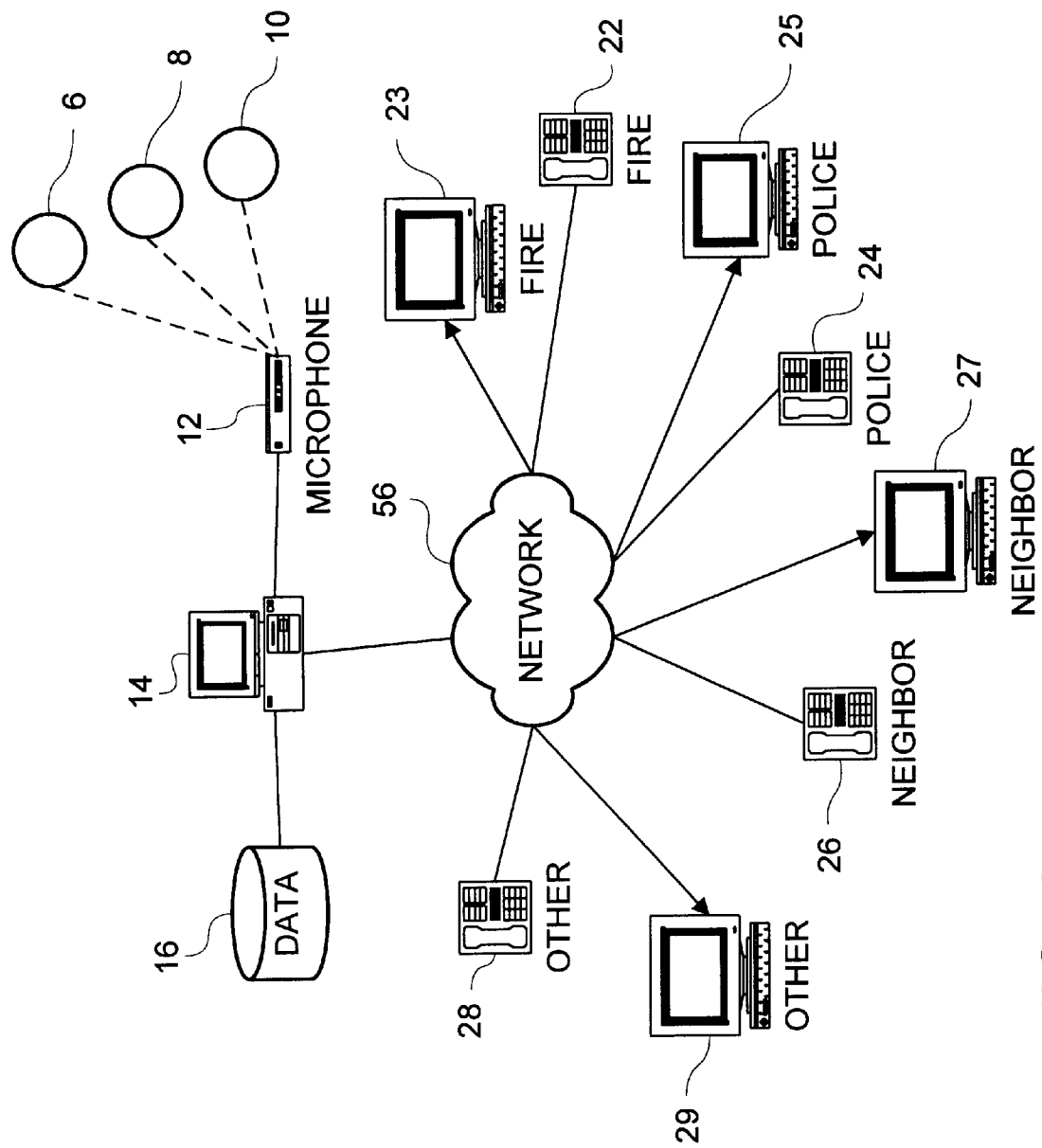
FIG. 2 is an illustration of the architecture of the present invention, with the PC contacting the alert authorities.

Whichever alarm is reported to monitoring station 18, the monitoring station then takes appropriate action over the public switched telephone network 20 to notify the fire department 22, the police department 24, a neighbor if one is designated 26, or any other designated point of contact 28 that a particular alarm has sounded at the residence. It should be noted that the monitoring station may in fact communicate to the alarm authorities via the Internet as well. For communication over the Internet, monitoring station 18 would notify the fire department 23, the police department 25, a neighbor if one is designated 27, or any other designated point of contact 29 that a particular alarm has sounded at the residence. Thus the second network may also be the Internet to allow the alarm reporting to take place. As noted earlier, such reporting can be via e-mail, fax, voice or any other communication method capable of reporting the necessary facts to the alarm authority Referring to FIG. 2, the architecture of the present invention wherein the PC directly contacts the alert authorities is shown. In this case, alarm 6, 8, and 10 all emit audio signals which are characteristic of the particular hazard or situation they are monitoring. For example, break in alarm 6 has one characteristic audio tone, fire alarm 8 has a different characteristic audio tone, and water alert 10 has yet another different characteristic audio tone. When any of these alarms sound, the audio tone is detected by microphone 12, which sends the audio signal to PC 14, which is constantly monitoring for audio input from microphone 12.

Analysis of the signal occurs in the same manner as previously described.

In this case, however, the PC connects directly to a network which may be either the Internet or the public switched telephone network ("PSTN"), which in this figure is generically noted as being a network 56. In the case of the PSTN, PC 14 has a series of telephone numbers, e-mail addresses, fax numbers or other address identifiers are stored in database 16 and associated with the data characterizing individual detectors 6, 8, and 10. If, for example, the fire alarm 8 sounds, the signal is picked up by microphone 12, processed by the PC 14 and determined to be the fire alarm. The telephone number of the fire department is stored in the database and associated with the characteristic tone stored for the fire alarm. When the fire alarm is detected, PC 14 automatically invokes its communication protocol and dials, e-mails or otherwise communicates with the fire department, providing a standardized message in a digital voice form, e-mail form or other forms required to the fire department 22, noting that the fire alarm at the premises has sounded.

For communication over the Internet, PC 14 would notify the fire department 23, the police department 25, a neighbor if one is designated 27, or any other designated point of contact 29 that a particular alarm has sounded at the residence. Similarly, other alert authorities such as the police 24, a neighbor 26, or any other source 28 can be contacted via telephone with a synthesized voice message provided to that location noting that a particular alarm has sounded.

In the event that network 56 is the Internet, PC 14 has a URL associated with each alarm. When an alarm sounds, the sound from the alarm is characterized, for example, from the break in sensor 6. That tone is determined to be from the break in sensor 6 and the appropriate URL is invoked in the browser program of the PC 14. Thereafter, a message is sent via the Internet, generally depicted as network 56, to the police 24 that a particular alarm has sounded at the premises. Again the message may be a fax, e-mail or other type of communication.

Again, similar messages can be sent to the appropriate alert authorities depending upon which alarm has sounded.

An audio-link fire alarm monitoring system has been disclosed. It will be apparent to those skilled in the art that any number of networks can be used to notify the appropriate authorities of the presence of a particular alarm condition. Other implementations of the present invention involving an audio determination of a particular signal for notifying alert authorities will be apparent to those skilled in the art, and are deemed to be within the scope of the invention as disclosed.

I claim:

1. A security system audio monitoring system comprising:
   at least one detector adapted to send an aural signal when a condition is met;
   a microphone within aural range of the at least one detector and adapted to receive the aural signal and output an audio signal;
   a processor connected to the microphone and adapted to receive and process the audio signal from the microphone for identifying the type of detector that produced the aural signal, and further adapted to send a notification when the aural signal is processed;
   a first network connected to the processor;
   a monitoring center connected to the first network adapted to receive the processed audio signals from the processor over the first network and further adapted to automatically send a notification to an alarm authority when the signals are received;
   a second network connected to the monitoring center; and
   at least one alarm authority adapted to receive notifications from the monitoring center over the second network.

2. The security system audio monitoring system of claim 1 wherein the at least one detector is selected from the group consisting of fire detectors, smoke alarms, "breaking glass" alarms, perimeter alarms, and motion detectors.

3. The security system audio monitoring system of claim 1 wherein the first network is the Internet.

4. The security system audio monitoring system of claim 1 wherein the second network is a public switched telephone network.

5. The security system audio monitoring system of claim 1 wherein the at least one alarm authority is selected from the group consisting of fire departments, police departments, neighbors, those entities designated by a home owner, and those entities designated by a business owner.

6. The security system audio monitoring system of claim 1 wherein the audio signal process comprises applying an FFT to the audio signal to characterize the audio signal as coming from the at least one detector.

7. A security system audio monitoring system comprising:
   at least one detector adapted to send an aural signal when an alarm condition is met;
   a microphone within aural range of the at least one detector and adapted to receive the aural signal and output and audio signal;
   a processor connected to the microphone and adapted to receive and process audio signals from the microphone, and further adapted to identify the audio signal type and send an appropriate notification to at least one an alarm authority when signals are processed;
   a network connected to the processor; and
   the at least one alarm authority adapted to receive the appropriate notification from the processor.

* * * * *